US012556972B2

(12) United States Patent
Curic et al.

(10) Patent No.: US 12,556,972 B2
(45) Date of Patent: Feb. 17, 2026

(54) AUTOMATED DETECTION AND MITIGATION OF INTRA- AND INTERDOMAIN CONFLICTS IN OPEN RADIO ACCESS NETWORKS

(71) Applicant: International Business Machines Corporation, Armonk, NY (US)

(72) Inventors: Maja Curic, Munich (DE); Sagar Tayal, Ambala (IN); David Jason Hunt, Kirkwood, MO (US)

(73) Assignee: International Business Machines Corporation, Armonk, NY (US)

( * ) Notice: Subject to any disclaimer, the term of this patent is extended or adjusted under 35 U.S.C. 154(b) by 641 days.

(21) Appl. No.: 17/932,737

(22) Filed: Sep. 16, 2022

(65) Prior Publication Data

US 2024/0098568 A1   Mar. 21, 2024

(51) Int. Cl.
*H04W 28/10* (2009.01)
*H04W 28/08* (2023.01)

(52) U.S. Cl.
CPC ... *H04W 28/0925* (2020.05); *H04W 28/0846* (2020.05); *H04W 28/10* (2013.01)

(58) Field of Classification Search
CPC ......... H04W 28/0925; H04W 28/0846; H04W 28/10
See application file for complete search history.

(56) References Cited

U.S. PATENT DOCUMENTS

| | | | |
|---|---|---|---|
| 8,737,195 B2 | 5/2014 | Ohashi | |
| 9,319,901 B2 | 4/2016 | Shen et al. | |
| 9,491,615 B2 | 11/2016 | Gerstenberger et al. | |
| 10,708,920 B2 | 7/2020 | Kitazoe et al. | |
| 2017/0064579 A1 | 3/2017 | Park et al. | |
| 2021/0184989 A1 | 6/2021 | Wu et al. | |
| 2024/0155358 A1* | 5/2024 | Montalvo | H04W 28/0925 |

FOREIGN PATENT DOCUMENTS

| | | |
|---|---|---|
| EP | 2672750 A1 | 12/2013 |
| JP | 5510293 B2 | 6/2014 |

OTHER PUBLICATIONS

Lupu et al., "Conflicts in Policy-Based Distributed Systems Management," IEEE Transactions on Software Engineering, vol. 25, No. 6, Nov./Dec. 1999, pp. 852-869.

* cited by examiner

Primary Examiner — Ronald B Abelson
(74) Attorney, Agent, or Firm — CANTOR COLBURN LLP; Tihon Poltavets

(57) ABSTRACT

A computer-implemented method for addressing conflicts in a radio access network (RAN) includes generating, by a non-Real-Time RAN Intelligent Controller (non-RT RIC), a policy for a near-Real-Time RAN Intelligent Controller (near-RT RIC) by analyzing an activity log of several xApps, which are being executed by the near-RT RIC. The method further includes sending, by the non-RT RIC the policy to the near-RT RIC to cause the near-RT RIC, in response to receiving a request from an xApp from the several xApps to update a parameter of the RAN. The policy specifies an update the parameter based on the policy allowing the xApp to update the parameter. The policy further specifies maintaining the parameter unchanged based on the policy restricting the xApp to update the parameter.

20 Claims, 11 Drawing Sheets

| xApp ID | Optimization Targets (A=accessibility, B=packet loss, C=delay, D=jitter...) | Targeted configuration parameters |
|---|---|---|
| xApp1 | A, B, C | param1, param2, param3 |
| xApp2 | B, C, D | param4, param5 |
| xApp3 | D, B | param1, param3, param6 |
| xApp4 | C, E, F | param4, param6 |

FIG. 7

| Data and Time | Near-RT RIC | E2 Node ID | xApp ID | Trigger | Opt. Target | Configuration Change |
|---|---|---|---|---|---|---|
| 2022-02-03 03:51:52 PM | NRT1 | CU/DU1 | xApp1 | T1 | A | parameter1=value1 |
| 2022-02-03 03:51:56 PM | NRT2 | CU/DU2 | xApp1 | T2 | B | parameter1=value2 |
| 2022-02-03 03:51:59 PM | NRT1 | CU/DU3 | xApp2 | T3 | B | parameter2=value3 |
| 2022-02-03 03:52:02 PM | NRT1 | CU/DU1 | xApp1 | T1 | A | parameter1=value4 |

FIG. 8

| Timestamp | E2 Node ID | Performance KPIs | FM Status |
|---|---|---|---|
| 2022-02-03 03:51:52 PM | CU/DU1 | kpi1=val1, kpi2=val2, kpi3=val3,... | stat1, stat2, stat3,... |
| 2022-02-03 03:51:56 PM | CU/DU2 | kpi1=val4, kpi2=val5, kpi3=val6,... | stat7, stat8, stat9,... |
| 2022-02-03 03:51:59 PM | CU/DU3 | kpi1=val10, kpi2=val11, kpi3=val12,... | stat13, stat14,... |

FIG. 9

AUTOMATED DETECTION AND MITIGATION OF INTRA- AND INTERDOMAIN CONFLICTS IN OPEN RADIO ACCESS NETWORKS

BACKGROUND

The present invention relates to computer technology, particularly to programmable networks and even more specifically to programmable radio access networks (RANs) that use the open-RAN (O-RAN) network standards.

A RAN is a portion of a telecommunication system, typically, that connects a user equipment (UE) device, such as a mobile phone, a computer, or any remotely controlled machine and the core network (CN) of the telecommunication system. The RAN functionality is generally provided by hardware and/or software residing in base station in proximity to cell site. O-RAN refers to a disaggregated approach to deploying a RAN by using open and/or interoperable protocols and interfaces, which allows for increased flexibility over traditional RAN systems. O-RAN can be implemented with vendor-neutral hardware and software-defined technology based on open interfaces and industry-developed standards.

SUMMARY

According to one or more embodiments of the present invention, a computer-implemented method for addressing conflicts in a radio access network (RAN) includes generating, by a non-Real-Time RAN Intelligent Controller (non-RT RIC), a policy for a near-Real-Time RAN Intelligent Controller (near-RT RIC) by analyzing an activity log of several xApps, which are being executed by the near-RT RIC. The method further includes sending, by the non-RT RIC the policy to the near-RT RIC to cause the near-RT RIC, in response to receiving a request from an xApp from the several xApps to update a parameter of the RAN. The policy specifies an update the parameter based on the policy allowing the xApp to update the parameter. The policy further specifies maintaining the parameter unchanged based on the policy restricting the xApp to update the parameter.

According to one or more embodiments of the present invention, the activity log further includes log data of xApps being executed across several near-RT RICs.

According to one or more embodiments of the present invention, the non-RT RIC generates the policy using machine learning.

According to one or more embodiments of the present invention, the near-RT RIC updates the activity log in response to each action taken by any of the several xApps.

According to one or more embodiments of the present invention, the policy is generated to avoid a conflict detected by the analyzing of the activity log. In one or more embodiments of the present invention, the conflict is one of a direct conflict, an indirect conflict, and an implicit conflict. In one or more embodiments of the present invention, the conflict is one of an intra-domain conflict and an inter-domain conflict.

According to one or more embodiments of the present invention, the near-RT RIC captures a snapshot of one or more performance indicators prior to changing the parameter, and a snapshot of the one or more performance indicators after changing the parameter. Further, the near-RT RIC validates the policy by checking that the one or more performance indicators satisfy a desired intent.

According to one or more embodiments of the present invention, the computer-implemented method further includes receiving, by the non-RT RIC, one or more operational intents that specify desired operating ranges for one or more performance indicators. The policy is generated based on the activity log and the one or more operational intents.

According to one or more embodiments of the present invention, the policy restrains the xApp to update the parameter within a particular range.

According to one or more embodiments of the present invention, the xApp is a first xApp, and wherein the policy restrains the first xApp to update the parameter, and does not restrain a second xApp to update the parameter.

According to one or more embodiments of the present invention, the near-RT RIC is a first near-RT RIC, and wherein the non-RT RIC sends the policy to a second near-RT RIC to be applied to the several xApps being executed by the second near-RT RIC.

According to one or more embodiments of the present invention, a system includes a non-real-time radio access network intelligent controller (non-RT RIC) of a radio access network (RAN). The system further includes several near-real-time RAN intelligent controllers (near-RT RICs) of the RAN, the non-RT RIC controls one or more operations of the near-RT RICs. The non-RT RIC generates a policy for a near-RT RIC from the plurality of near-RT RICs by analyzing an activity log of several xApps being executed by the near-RT RIC. In response to receiving a request from an xApp from the several xApps to update a parameter of the RAN, the near-RT RIC updates the parameter based on the policy allowing the xApp to update the parameter, and the near-RT RIC maintains the parameter unchanged based on the policy restricting the xApp from updating the parameter.

According to one or more embodiments of the present invention, a computer program product includes a memory device with computer-executable instructions therein, the computer-executable instructions when executed by a processing unit perform a method. The method addresses conflicts in a radio access network (RAN). The method includes generating, by a non-Real-Time RAN Intelligent Controller (non-RT RIC), a policy for a near-Real-Time RAN Intelligent Controller (near-RT RIC) by analyzing an activity log of several xApps, which are being executed by the near-RT RIC. The method further includes sending, by the non-RT RIC the policy to the near-RT RIC to cause the near-RT RIC, in response to receiving a request from an xApp from the several xApps to update a parameter of the RAN. The policy specifies an update the parameter based on the policy allowing the xApp to update the parameter. The policy further specifies maintaining the parameter unchanged based on the policy restricting the xApp to update the parameter.

Embodiments of the invention described herein address technical challenges in computing technology, particularly in fields of telecommunications and computing networks. One or more embodiments of the present invention facilitate improvements to radio access networks (RANs), particularly open-RAN (O-RAN) networks. Embodiments of the present invention provide technical solutions that facilitate automated conflict detection. One or more embodiments of the present invention detect indirect and implicit conflicts among operations of a near-RT RICs, regardless of whether the conflicts occur on the same or different (neighboring) Near-RT RICs. Further, embodiments of the present invention detect and mitigate any type of conflict that occur interor intra-domain (as defined herein). Additional advantages will also be evident based on the description herein.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings.

FIG. 7 depicts an example descriptor collection according to one or more embodiments of the present invention;

FIG. 8 depicts an example activity log according to one or more embodiments of the present invention;

FIG. 9 depicts an example performance and fault data matrix according to one or more embodiments of the present invention;

Figure 1:
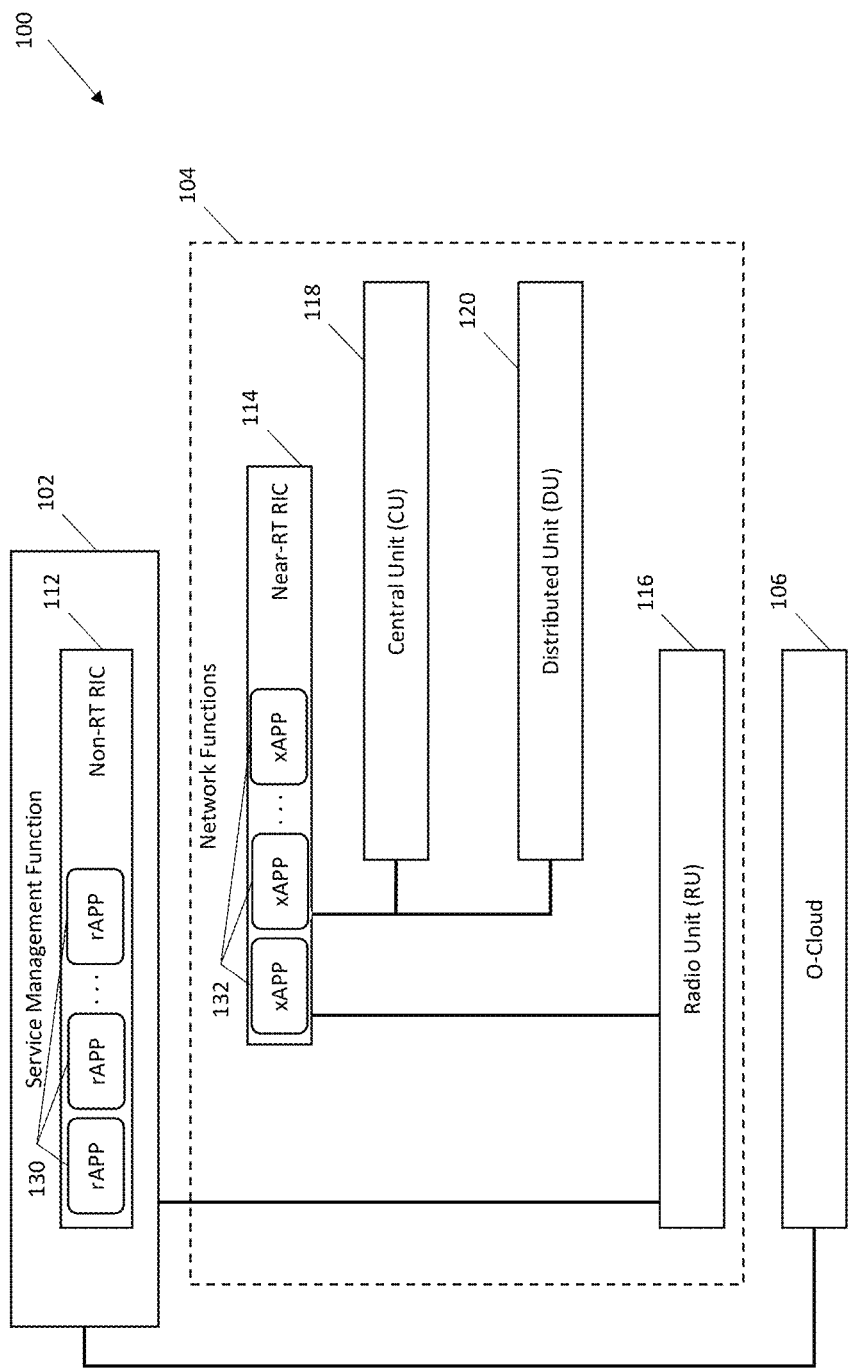
FIG. 1 depicts a open radio access network (O-RAN) architecture according to one or more embodiments of the present invention.

The diagrams depicted herein are illustrative. There can be many variations to the diagrams, or the operations described therein without departing from the spirit of the invention. For instance, the actions can be performed in a differing order, or actions can be added, deleted, or modified. Also, the term "coupled," and variations thereof describe having a communications path between two elements and do not imply a direct connection between the elements with no intervening elements/connections between them. All of these variations are considered a part of the specification.

In the accompanying figures and following detailed description of the disclosed embodiments, the various elements illustrated in the figures are provided with two or three-digit reference numbers. With minor exceptions, the leftmost digit(s) of each reference number corresponds to the figure in which its element is first illustrated.

DETAILED DESCRIPTION

Description herein makes reference to Third Generation Partnership Project (3GPP) system, the O-RAN Fronthaul Working Group, and the xRAN Fronthaul Working Group. The description herein uses abbreviations, terms and technology defined in accord 3GPP technology standards, O-RAN Fronthaul Working Group technology standards, and xRAN Fronthaul Working Group technology standards. As such, the 3GPP, O-RAN Fronthaul Working Group, and xRAN Fronthaul Working Group technical specifications (TS) and technical reports (TR) referenced herein are incorporated by reference in their entirety herein and define the related terms and architecture reference models that follow. References may also made to CPRI, the Industry Initiative for a Common Public Radio Interface, and abbreviations, terms and technology defined in eCPRI technology standard may also be used consistent with 3GPP technology standards. The CPRI technical specification eCPRI specifications (e.g., V1.1 (2018 Jan. 10)), is also incorporated by reference in its entirety herein.

Embodiments of the invention described herein address technical challenges in computing technology, particularly in fields of telecommunications and computing networks. One or more embodiments of the present invention facilitate improvements to radio access networks (RANs), particularly open-RAN (O-RAN) networks. Embodiments of the present invention provide technical solutions that facilitate automated conflict detection. One or more embodiments of the present invention detect indirect and implicit conflicts among operations of a near-RT RICs, regardless of whether the conflicts occur on the same or different (neighboring) Near-RT RICs. Further, embodiments of the present invention detect and mitigate any type of conflict that occur inter- or intra-domain (as defined herein). Additional advantages will also be evident based on the description herein.

Conventional RANs were built employing a single unit that processed the entirety of communication protocols for the RAN. The RAN network traditionally used application specific hardware for processing, making them difficult to upgrade and evolve. However, communication networks and needs evolved, with growing need to support increased capacity. Accordingly, there were (and still are) efforts to reduce the costs of RAN deployment and improve scalability and upgradeability of the RAN equipment. Cloud based Radio Access Networks (CRAN) are networks where a significant portion of the RAN layer processing is performed at a centralized/central unit (CU), sometimes also referred to as a baseband unit (BBU). Typically, the CU is located in the cloud on commercial off the shelf servers while the RF and real-time critical functions are processed in a remote radio unit (RU or RRU) and a distributed unit (DU). In some embodiments, the DU can be part of the CU/BBU depending on the functional split.

CRAN provides centralization and virtualization of RAN, with improvements over earlier architecture of RAN. Such improvements include reduction in operating cost (e.g., because of resource pooling, enabling economies of scale etc.), improvement in performance improvements (e.g., improved interference), remote upgradeability and management, and improved configurability of features (e.g., transition from 4G to 5G networks).

By using distributed cloud technology, CRAN ensures flexibility and scalability of the network and opens up the possibility to support modern end-user services, such as virtual reality, V2X, remote surgery and many more, that have much stricter service level agreement (SLA) requirements compared to the legacy services. Operation processes in modern networks are automated because they are to occur at a sub-second time scale. The state-of-the-art networks must be able to support different use cases with various SLA requirements at the same time, e.g., high throughput, ultra-low latency, better signal quality, etc. In this respect, the technical challenges posed to modern networks include at least the following: optimize network utilization by scheduling resource allocations and implementing self-optimization rules at a sub-second time scale; and act swiftly on dynamic network conditions, such as traffic bursts or traffic shifts, to ensure the SLA for all the active services.

The automated network operations for self-decision making have become essential and inevitable part of the overall network design. Indeed, the modern network architectures integrate operation processes in their overall design and, as a result, include network infrastructure that is used to commute the user traffic. The footprint of this infrastructure is increased compared to the legacy networks, which is driven by the increase in the network traffic amount and strict SLA requirements of the novel services. Further, modern network infrastructure has been improved to host the automated operations processes. This infrastructure must be installed in the proximity of the end-users, it must be redundant and fail-safe. Compared to the legacy networks, the amount of infrastructure for operations is significantly increased.

As a result, the overall network infrastructure in the modern networks is significantly increased compared to the legacy networks. O-RAN is one such example of the state-of-the-art modern network. Besides network infrastructure that is used to carry the user traffic in O-RAN (hosting RUs, O-DUs and O-CUs, small cells etc.), telecommunication operators have to introduce additional extensive network infrastructure to host the non-RT RICs and several near-RT RICs for faster decision-making control loops.

Broadly, an O-RAN is a nonproprietary version of a CRAN system that allows interoperation between network equipment provided by different vendors. The O-RAN alliance issues specifications and standards that the vendors are required to facilitate operation of an O-RAN system.

A brief description of an O-RAN architecture is now described with reference to FIG. 1. It is understood that other embodiments of the present invention can use different, fewer, or additional components than depicted herein without diverging from the technical solutions described herein. In some embodiments of the present invention one or more components depicted herein may be combined or further split (distributed), again without diverting from the technical solutions described herein.

The O-RAN architecture 100 includes several components that inter-communicate over different interfaces. Each interface uses a different name per the O-RAN specification, and includes the A1 interface, the O1 interface, the O2 interface, and the Open Fronthaul Management (M)-plane interface. The interfaces connect the Service Management and Orchestration (SMO) framework 102 to O-RAN network functions (NFs) 104. The NFs 104 include for example, near-RT RICs 114, radio units 116, and other components. The interfaces also connect the SMO 102 and the O-Cloud 106. The O-Cloud 106 can be a cloud computing platform including a collection of physical infrastructure nodes to host the relevant O-RAN network functions (e.g., the near-RT RIC 114, O-CU 118, O-DU 120), supporting software components (e.g., operating systems, virtual machines, container runtime engines, machine learning engines, etc.), and appropriate management and orchestration functions. It should be noted that the SMO 102 and the other components shown can connect with other components (e.g., an enrichment data source, NG-CORE, etc.) that are not depicted herein.

The SMO 102 includes the non-RT RIC 112, which connects with the near-RT RIC 114, for example, via the A1 interface. The SMO 102 can also connect with one or more of the NFs 104. The O-RAN NFs 104 can be virtual network functions (VNFs) such as virtual machines or containers, implemented above the O-Cloud 106 layer and/or above one or more Physical Network Functions (PNFs). The O-RAN NFs 104 may be implemented using customized hardware, however, all the O-RAN NFs 304 support the O1 interface when interfacing with the SMO framework 102.

Further, the SMO 102 manages the O-RAN Radio Unit (O-RU) 116 via the Open Fronthaul M-plane interface. The Open Fronthaul M-plane interface is an optional interface that is included for backward compatibility purposes in particular modes, such as the hybrid mode as defined in O-RAN specifications.

Conventionally, the SMO 102 with the non-RT RIC 112, and the O-Cloud 106 are referred to as "management portion/side" of the O-RAN 100; and the near-RT RIC 114, the O-DU 120, the O-RU 116, the O-CU 118 functions are referred to as "radio portion/side" of the O-RAN architecture 100. In some embodiments of the invention, the radio portion/side also include the gNB (not shown). The gNB 410 is an LTE eNB, a 5G gNB or ng-eNB that supports the E2 interface.

The O-RU 116 is a logical node hosting lower PHY layer entities/elements (Low-PHY layer) (e.g., FFT/iFFT, PRACH extraction, etc.) and RF processing elements based on a lower layer functional split. Virtualization of O-RU 116 is FFS. The O-CU 118 is a logical node hosting the RRC and the control plane (CP) part of the PDCP protocol. The O-CU 118 also hosts the user plane part of the PDCP protocol and the SDAP protocol. The O-DU 120 is a logical node hosting RLC, MAC, and higher PHY layer entities/elements (High-PHY layers) based on a lower layer functional split. Conventionally, the O-CU 118 and the O-DU 120 are referred to as "E2" nodes, because the near-RT RIC 114 connects with them via the E2 interface. In some cases, the gNB may also be included as an E2 node for the same reasons. The protocols over E2 interface are based exclusively on Control Plane (CP) protocols. The E2 functions are grouped into the following categories: near-RT RIC services (REPORT, INSERT, CONTROL and POLICY); near-RT RIC support functions, which include E2 Interface Management (E2 Setup, E2 Reset, Reporting of General Error Situations, etc.); and near-RT RIC Service Update (e.g., capability exchange related to the list of E2 Node functions exposed over E2).

In one or more embodiments of the present invention, the Uu interface is used between a UE (not shown), the gNB, and any other O-RAN components. The Uu interface is a 3GPP defined interface, which includes a complete protocol stack from L1 to L3. While only single components are shown herein, it is understood that the O-RAN 100 can include several UEs and/or several gNB, each of which may be connected to one another the via respective Uu interfaces. Also, while not shown, the O-RAN architecture 100 can include other interfaces (E1, F1-c, NG-c, X2-c, etc.) that connect the components to other components (that are not shown, e.g., en-gNB, gNB-CU, etc.) and/or to components that are shown.

The non-RT RIC 112 is a logical function within the SMO framework 102 that enables non-real-time (>1 second operation times) control and optimization of RAN elements and resources; AI/machine learning (ML) workflow(s) including model training, inferences, and updates; and policy-based guidance of applications/features in the near-RT RIC 114. In some embodiments of the present invention, the non-RT RIC 112 can be an ML training host to host the training of one or more ML models. ML training can be performed offline using data collected from the near-RT RIC, O-DU 120, and O-RU 116. The near-RT RIC 114 is a logical function that enables near-real-time (sub 1 second operation times) control and optimization of RAN elements and resources via fine-grained, data collection and actions over the E2 interface. The near-RT RIC 114 may include one or more AI/ML workflows including model training, inferences, and updates.

O-RAN is built on the foundation of virtualization, automation, and cloud technologies. NFs 104 are disaggregated and there are open interfaces between them. To be able to support the modern services, O-RAN integrates automated operations into its overall architecture by providing three control loops of different time scales for different operation and optimization processes. The non-real-time control loop (involving the non-RT RIC 112 in SMO 102) has above-second time-frame, the near-real time control loop (involving the near-RT RICs 114) has sub-second time-frame, and finally, the real-time control loop (involving the O-DU 120) has the time-frame that is below 10 ms.

The cloud-native nature of the NFs 104 in the O-RAN allow various deployment options, in which some or all functionalities can be bundled together as per the infrastructure availability and operator deployment preference. For more details regarding deployment options, one should refer to the Technical Specification document "O-RAN Architecture Description" from O-RAN WG1. Any O-RAN deployment scenario must ensure that the timing requirements of each of the three control loops are met.

O-RAN specifications further characterizes the interfaces into a control plane, a management plane, a synchronization plane, and a user plane. Control Plane (C-plane) refers to real-time control between O-DU 120 and O-RU 106, not including the IQ sample data (part of the User Plane). Management Plane (M-plane) refers to non-real-time management operations between the O-DU 120 and the O-RU 106. Synchronization Plane (S-Plane) refers to traffic between the O-RU 106 or O-DU 120 to a synchronization controller which is generally an IEEE-1588 Grand Master. Grandmaster not only represents a highly accurate source of synchronization for all network devices supporting the Precision Time Protocol (PTP), the Network Time Protocol (NTP), and the Simple Network Time Protocol (SNTP), etc., it also offers a number of legacy time and frequency outputs for keeping non-networked devices in-sync. User Plane refers to IQ sample data transferred between O-DU 120 and O-RU 106.

The C- and U-plane Ethernet stack commonly uses a UDP (User Datagram Protocol) to carry eCPRI or RoE. If RoE is selected, it is carried over Ethernet L2 with a VLAN; eCPRI can be carried over Ethernet L2, or UDP. The C- and U-plane both have the highest priority via the VLAN (priority 7) and within the IP layer are defined as Expedited Forwarding.

The S-plane Ethernet stack uses Ethernet to carry PTP (Precision Time Protocol) and/or SyncE (Synchronous Ethernet) traffic so that end mobile elements are time-synchronized. In 5G networks, for example, it is particularly important that each RU, especially RUs in the same segment or adjoining segments (locations where UE (User Equipment) may be in contact with multiple RUs), is time-synchronized, allowing the 5G network to maintain high throughput while downloading data from multiple RUs at once, or while transferring from one RU to another.

The M-plane Ethernet stack uses TCP (Transmission Control Protocol) to carry the management messages between the RU 106 and DU 120. O-RAN defines a NETCONF/YANG profile to be carried over this layer via SSH (Secure Shell), allowing communication between the RU 106 and DU 120.

The O-RAN 100 can be used by several users that can be represent one or more user equipment, which can be of any type. For example, the users include IoT enabling devices (e.g., sensors, etc.), automated devices (e.g., factory appliances, home appliances, automated vehicles, etc.), user devices (e.g., phones, tablets, laptops, servers, etc.), or any other types of electronic devices that use the O-RAN 100 for communication. The components of O-RAN 100 uses one or more hardware equipment, which can include computer servers, modems, routers, switches, computing devices, and any other hardware devices used to implement a networking infrastructure. The hardware devices may implement one or more components of the O-RAN 100 (see FIG. 1) as virtual machines, software developed network modules, machine learning modules, or any other combination thereof.

In O-RAN 100, SMO 102, non-RT RIC 102, and near-RT RICs 104 continuously collect the network state. The RICs (102, 104) host applications (130, 132) that read the network state and govern the network behavior accordingly. These applications include rApps 130 on the non-RT RIC 102 and xApps 132 on near-RT RICS 104, respectively.

rApps 130, which reside in the centralized non-RT RIC 102, are used for identifying network governing policies that require insight into the end-to-end network state or exhaustive computing resources for their calculation. Such attributes, policies, and insights are available only on the non-RT RIC 102.

On the other hand, xApps 132 reside on the near-RT RICs 104, and are distributed. Typically, the xApps 132 are those applications that need to operate at timescales of less than a second. Instead, due to their proximity to the network entities (CUs 118, DUs 120, etc.), near-Real Time RICs 104 are used to host the xApps 132 that identify and enforce delay sensitive optimization policies that require insight in the domain state only. Accordingly, xApps 132 operate leveraging the near-real time control loop that is executed in under 1 s, whereas, for rApps 130 this time can be above 1 s.

There are various types of xApps 132. For example, a first type of xApps 132 can subscribe to rApps 130 and implement the policies that the rApps 130 issue over the interface A1. Second type of xApps 132 can execute independently from rApps 130 and govern the network behavior according to their own logic. xApps 132 execute in parallel of each other and conflicts can occur. Such conflicts can cause network instability or performance degradation. Conflicts also cause a security risk in O-RAN 100 because attackers may use such a conflict as a vulnerability to attack the network.

O-RAN Alliance has specified following conflict types between the xApps 132. Direct conflict: Different xApps 132 request to modify the same parameter (e.g., first xApp 132 requests increased antenna downtilt, and second xApp 132 requests decrease in the antenna downtilt). Indirect conflict: Different xApps 132 request to modify different parameters, but modifying the parameters can have the opposing effects, (e.g., first xApp 132 requests as antenna down tilt, and a second xApp 132 requests a power increase). Implicit conflict: Different xApps request to modify different parameters, which may not have opposing effects, but may cause the overall performance of the network to degrade.

An example of an implicit conflict includes when a first xAPP 132 requests change to load balancing threshold to push the traffic from its domain, while a second xApp 132 requests reducing the codec rate for accommodating traffic in its domain. Accordingly, the changes are not affecting similar KPI in both domains. Instead one domain is pushing the traffic while other is degrading the customer experience by downgrading the codec rate, thus posing an implicit conflict. It is understood that the examples of direct, indirect, and implicit conflicts herein are for illustration, and that there are several other scenarios in which such conflicts can occur. As such, the examples herein are not to be construed as limiting scenarios.

A technical challenge exists to detect and mitigate such conflicts in the O-RAN 100. Typically, direct and (some) indirect conflicts can be detected by leveraging pre-action resolution, in which the near-RT RIC 104 checks the parameters that certain xApp 132 is attempting to modify before the update is implemented in the network. In some cases, post-action verification is performed, in which the near-RT RIC 104 monitors the state of the network after the update has been implemented and verifies if the state is as expected. Implicit conflicts are not always easy to detect. The state-of-the-art telco today does not have formal mechanisms for identifying all indirect and implicit conflicts.

Embodiments of the present invention address such technical challenges regarding conflicts in O-RAN 100 by facilitating detection and mitigation of conflicts of any type. Embodiments of the present invention provide technical solutions that facilitate for automated xApp conflict detection. One or more embodiments of the present invention detect indirect and implicit xApp conflicts, regardless of whether the conflicting xApps 132 reside on the same or different (neighboring) Near-RT RICs 104. Further, embodiments of the present invention detect and mitigate any type of conflict that occur inter- or intra-domain (as defined herein).

At present, conflict management in O-RAN 100 is performed by near-RT RICs 104. O-RAN Alliance specifies (through documentation referenced herein) a conflict mitigation component in each near-RT RIC 104 (see FIG. 2, for example). Per the O-RAN specifications, prior to installing any updates in the network, xApps 132 leverage API (application programming interface) call(s) for E2 Guidance request(s), in which xApps 132 send their proposed changes for conflict mitigation component. The conflict mitigation component, which can be hardware/software, or a combination, provides a E2 Guidance response that indicates whether the proposed changes from the xApp 132 conflict with changes from other xApps 132. If yes, conflict management can recommend modification for the proposed changes to the xApp 132 to attempt to avoid the conflict(s).

Accordingly, embodiments of the present invention improve O-RAN architectures, such as the O-RAN architecture 100. Embodiments of the present invention, accordingly, is rooted in computing technology, and facilitates improvement to computing technology, particularly communication networks using O-RAN architecture. Such improvements include detecting and mitigating conflicts, such as xApp conflicts in near-RT RICs 104 in the O-RAN architecture. Additional improvements provided by embodiments of the present invention include optimizing the resource consumption. Further, embodiments of the present invention provide a practical application in the field of computing technology, particularly O-RAN, by establishing awareness in non-RT RIC 112 of xApp activities across all near-RT RICs 114 associated with that non-RT RIC 112. Further, one or more embodiments of the present invention facilitate non-RT RIC 112 to cause one or more near-RT RICs 114 to change xApp operations to avoid conflicts, and/or to mitigate effects of conflicts.

Figure 2:
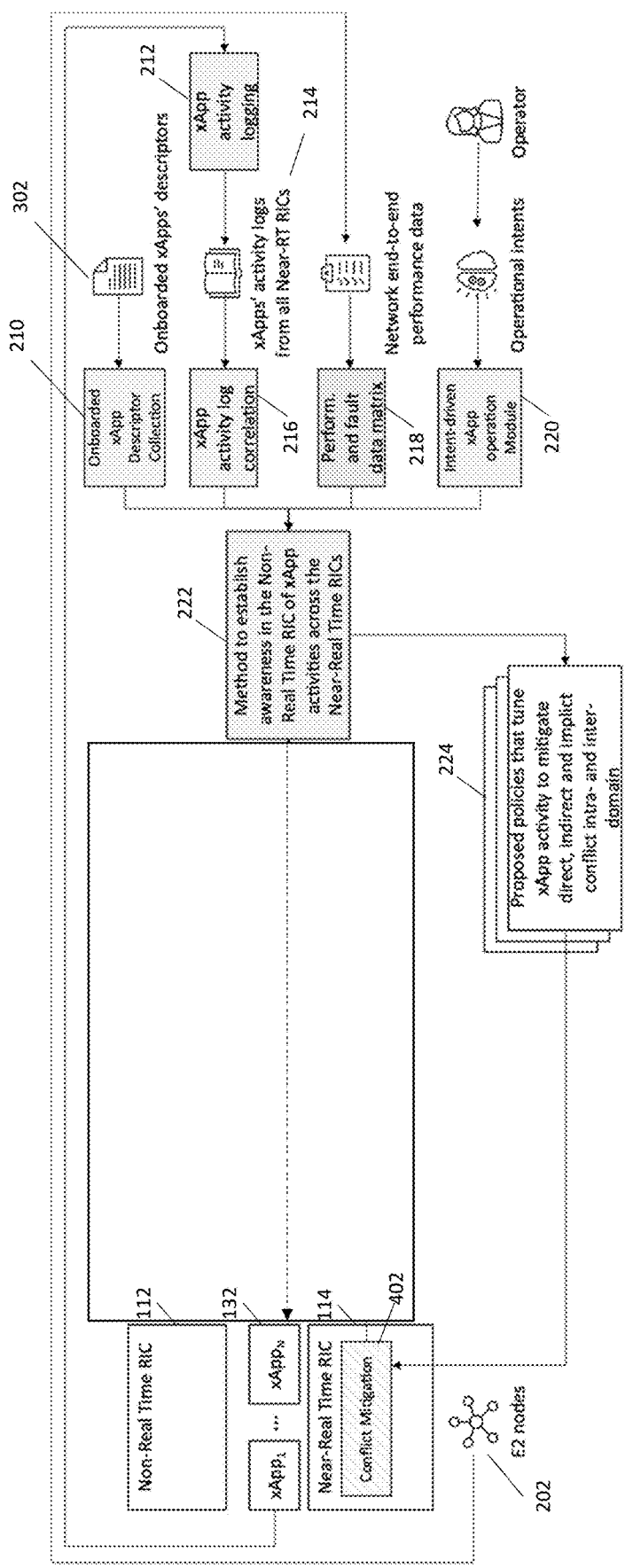
FIG. 2 depicts a flowchart of a method to detect and/or mitigate conflicts in an O-RAN according to one or more embodiments of the present invention.

FIG. 2 depicts a flowchart of a method to detect and/or mitigate conflicts in an O-RAN according to one or more embodiments of the present invention. The flowchart depicts an O-RAN 100 to which several E2 nodes 202 (CUs 118, DUs 120, etc.) connect. The method 200 facilitates detecting and mitigating conflicts in O-RAN 100. The one or more operations of method 200 are executed by the near-RT RICs 114 and the non-RT RIC 112.

Figure 3:
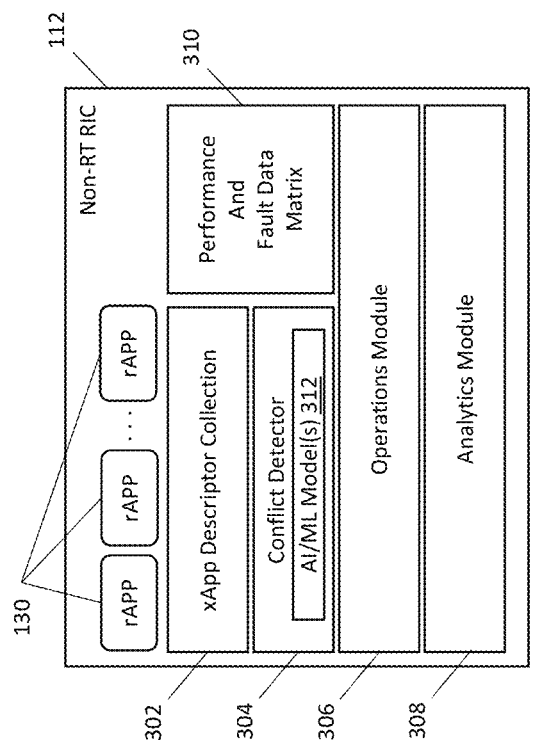
FIG. 3 depicts a non-Real-Time RAN Intelligent Controller (non-RT RIC) according to one or more embodiments of the present invention.

FIG. 3 depicts a non-RT RIC according to one or more embodiments of the present invention. The non-RT RIC 112 can be a computer server in one or more embodiments of the present invention. In some cases, the computer server can use distributed computing. Alternatively, or in addition, the non-RT RIC 112 can be any other type of computing device, such as a desktop computer, a laptop computer, a portable computer, etc.

In addition to several other components of a typical non-RT RIC 112, according to one or more embodiments of the present invention, the non-RT RIC 112 includes an xApp Descriptor Collection 302, a conflict detector 304, operations module 306, and an analytics module 308. In some embodiments of the present invention, the non-RT RIC 112 also includes a performance and fault data matrix 310. It is understood that the above components can be further partitioned, or combined in one or more embodiments of the present invention. The components listed above can be hardware and/or software components. In one or more embodiments of the present invention, one or more processing units implement the above components by executing one or more computer-executable instructions. The components can communicate with each other in a wired and/or wireless manner.

The xApp descriptor collection 302 has an entry for each xApp 132 that is installed on a near-RT RIC 114, which is in communication with the non-RT RIC 112. Each respective entry in the xApp descriptor collection 302 represents a description of one or more attributes of a corresponding xApp 132. At least some of the information stored in the entry is obtained from an xApp descriptor of the corresponding xApp 132. The xApp descriptor collection 302 is used to store and maintain a mapping of an xApp 132 with its optimization target as well as a list of the parameters that the xApp is configured to target. For example, an xAPP descriptor for PCI (Physical Cell ID) conflict management may be responsible for optimization targets, which can include interference, retainability, and packet loss. Target configuration parameters may cause PCI change. Similarly xAPP description for load balancer may be responsible for optimization targets capacity, throughput, accessibility, and its target configuration parameters may be handover threshold, time to trigger handover, PRB (Physical Resource Block) utilization.

In one or more embodiments of the present invention, the xApp descriptor collection 302 ("descriptor collection" 302) is a database or any other type of data structure that facilitates storing, updating, deleting, accessing, and performing any other digital operation on the data stored in an efficient manner.

The Conflict Detector 304 facilitates identifying occurrence of a conflict. The conflict detector 304 periodically or on-demand retrieves logged data from)(App Activity Log available on the near-RT RICs 114 to detect occurrence (or not) of a conflict. In one or more embodiments of the present invention, the conflict detector is in communication with the analytics module 308 and performs the detection in response to a command form the analytics module 308. The conflict detector 304 also may identify patterns that indicate conflict occurrence in some embodiments of the present invention. For example, the conflict detector 304 can use one or more artificial intelligence (AI)/machine learning (ML) based algorithm(s)/model(s) 312 over the logged data to identify occurrence of a conflict. The AI/ML model(s) 312 are pre-trained using a training dataset before being deployed on the non-RT RIC 112 in one or more embodiments of the present invention. The AI/ML model(s) 312 can be continuously updated as the non-RT RIC 112 is used. In one or more embodiments of the present invention, the trained AI/ML model(s) 312 classify the conflict-related patterns into different conflict types, i.e., direct, indirect, and implicit. By performing the conflict detection in the non-RT RIC 112, embodiments of the present invention can facilitate detecting inter-domain conflicts, because data/information required to make such a distinction is only available at the non-RT RIC 112.

The operations module 306 captures the intents that are to be applied on the operations plane. For example, the operator can specify that "operations that result with the overall accessibility in the observed domain that is higher than 97% and packet loss that is less than 0.5% is acceptable." Such an input from an operator is referred to as "intent" herein. In other words, an "intent" is a collection of one or more conditions such as associated with attribute values, thresholds, and/or ranges. In one or more embodiments of the present invention, the intent can be specified in any language (e.g., English, German, Mandarin, Japanese, Hindi, etc.) by an operator. The intent is parsed and codified by the operations module 306. The codification can include generating one or more scripts with attribute values, ranges, thresholds, etc., based on the input form the operator. The generated script can be in a computer-readable/executable form (computer-executable instructions), while the input from the operator may not be in such a form, rather a user-readable form. Alternatively, or in addition, the codified intent can be a stored using a vector data structure.

In one or more embodiments of the present invention, the operations module 306 is capable for keeping the record of all the previous and current intents.

The analytics module 308 facilitates policy identification based on one or more data sources including the xApp descriptor collection 302, conflict detector 304, operations module 306. In one or more embodiments of the present invention, the analytics module 308 also uses performance and fault data 310. The performance and fault data 310 is accumulated in a data structure, such as a matrix, a database, etc., as per the O-RAN specifications.

In one or more embodiments of the present invention, the analytics module 308 correlates the data from the one or more sources. Based on the correlated result the analytics module 308 creates one or more conflict-avoidance policies that are sent further over A1 interface to the near-RT RICs 114. In one or more embodiments of the present invention, the non-RT RIC 112 creates a respective set of policies for each near-RT RIC 114.

The conflict mitigator (402) in the near-RT RIC 114 receives such policies for that particular near-RT RIC 114. For example, a policy can indicate that "if accessibility in the domain covered by O-CU$_X$ and O-CU$_Y$ is between level L1 and level L2, xApp1 may only perform updates on the parameter P1 and xApp2 may only perform updates on the parameter P2, but xApp3 should not be allowed to make changes on any parameter in the observed domain". Upon reception of such policies, the conflict mitigator (402) aligns to them by updating the operational logic of the near-RT RIC 114. Updating the operational logic can include updating computer-executable instructions that are executed on the near-RT RIC 114.

Figure 4:
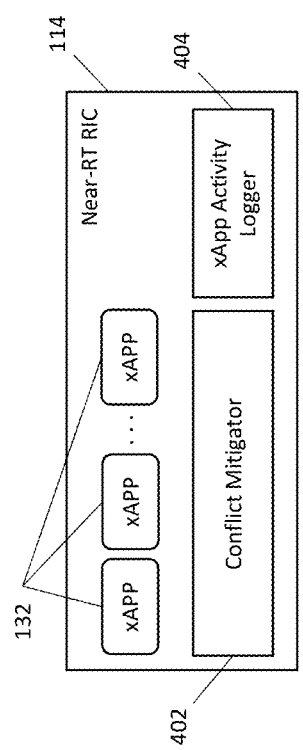
FIG. 4 depicts a near-Real-Time RAN Intelligent Controller (near-RT RIC) according to one or more embodiments of the present invention.

FIG. 4 depicts a near-RT RIC according to one or more embodiments of the present invention. The near-RT RIC 114 includes all of the components as specified by the O-RAN specifications. In one or more embodiments of the present invention, the near-RT RIC 114 includes a conflict mitigator 402 and an xApp activity logger 404 ("activity logger" 404).

Embodiments of the present invention facilitate the conflict mitigator 402 to perform several functions to address the technical challenges described herein related to conflict detection and mitigation. The conflict mitigator 402 receives the conflict-mitigation policies, via the A1 interface, store them, from the non-RT RIC 112 and retrieve when needed, i.e., every time when new E2 Guidance request arrives from each xApp 132. The conflict mitigator 402 determines whether the update (included in the E2 Guidance request) should be confirmed (i.e., applied) or rejected based on the received policies. Accordingly, the near-RT RIC 114 adjusts the xApps 132 based on one or more policies that are dynamically adjusted by the non-RT RIC 112 to avoid/mitigate conflicts.

One or more policies are dynamically created, in some embodiments of the present invention, specifically for each particular near-RT RIC 114. The policies are created based on logged data as accumulated by the xApp activity logger 404, which logs activities, e.g., implemented network updates, which were performed by the xApps 132. The xApps 132 only log activities, i.e., network updates, which were approved by the conflict mitigator 402 in one or more embodiments of the present invention. further, in one or more embodiments of the present invention, the logging is performed only if the update that is approved is successfully implemented in the network. xApps 132 do not log proposed updates that were either rejected by the conflict mitigator or by the E2 nodes in the update installation phase.

In one or more embodiments of the present invention, the xApps activity logger 404, for each xApp 132 logs at least the following information. Date and time when the successful activity installation has been observed in the network. In one or more embodiments of the present invention, the date and time is stored as a timestamp representing coordinated universal time (UTC) when the xApp 132 received confirmation from the network that the update was successfully installed. The logged data further includes identity of the near-RT RIC 114 instance on which the xApp 132 resides. The identity can be the near-RT RIC's IP (internet protocol) address, for example. Alternatively, or in addition, the identity can include a MAC (media access controller) address, or any other unique attribute or a combination of attributes associated with the near-RT RIC 114.

In one or more embodiments of the present invention, the logged data can also include identities of E2 nodes 402 that are affected with the update to the xApp 132. The E2 nodes 202 can include one or more CUs 118, DUs 120, etc.

An identifier of the xApp 132 that is being requested to update is also stored in the logged data. The identifier of the xApp 132 can be a hash value, a version identifier, or any other unique identity of the xApp 132.

Further, the logged data includes triggering conditions, in which the xApp 132 specifies the reason for the performed action, e.g., load crossing x Erlang optimization goal, e.g., packet loss improvement, latency reduction, etc.

The activity logger 404 can also store a list of parameters affected with the update. For example, the list can store old and new value for each affected parameter. Note that this list can contain an arbitrary number of parameters in some embodiments of the present invention.

The xApp Activity Logger 404 stores the logged data electronically. In one or more embodiments of the present invention, the logged data is stored using a predetermined data structure and data format. The logged data is accessible and portable for to be delivered, upon request, e.g., to the non-RT RIC 112. Alternatively, or in addition, the logged data, or at least a portion of it (e.g., the most recently updated portion) can be sent to the non-RT RIC 112 in a periodic manner. The data transmission can occur in a wired/wireless manner.

Referring to method 200 of FIG. 2, the components of the improved non-RT RIC 112 and near-RT RICs 114 facilitate detecting direct, indirect, and implicit conflicts for both intra- and inter-domain. While the O-RAN specification only has the direct, indirect, and implicit conflicts, embodiments of the invention herein further improve the O-RAN by specifying intra- and inter-domain conflicts.

Figure 5:
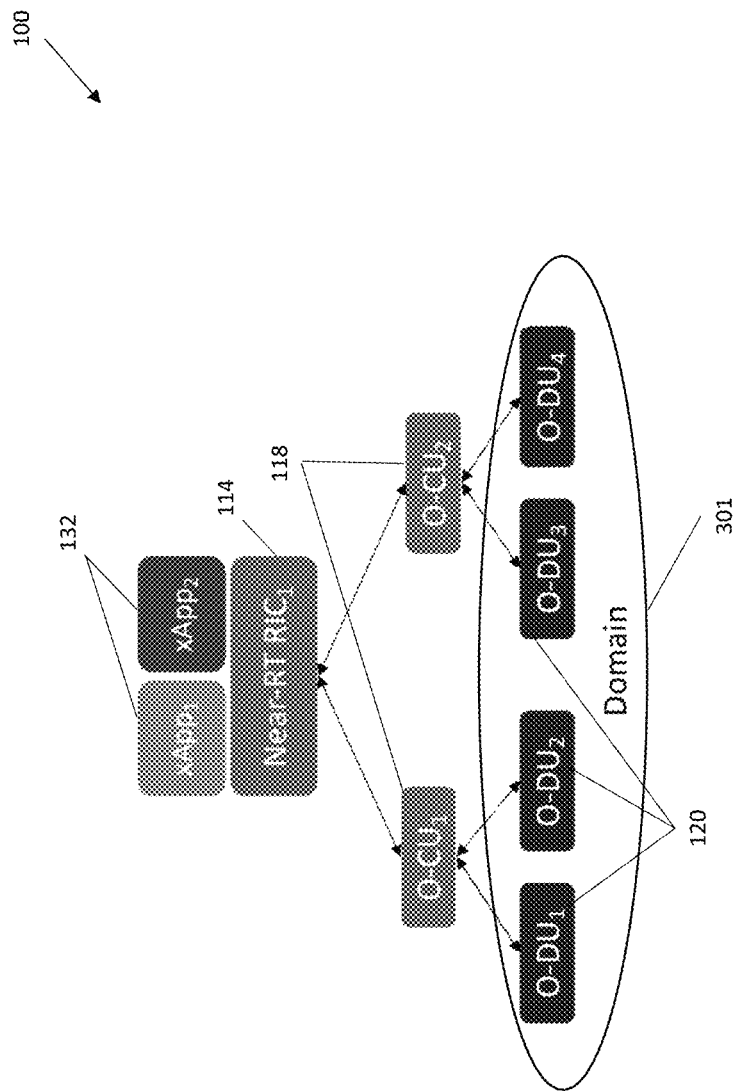
FIG. 5 depicts an intra-domain conflict according to one or more embodiments of the present invention.

FIG. 5 depicts an intra-domain conflict according to one or more embodiments of the present invention. From the domain point of view, an intra-domain conflict is one in which conflicting xApps 132 reside on the same near-RT RIC 114.

Figure 6:
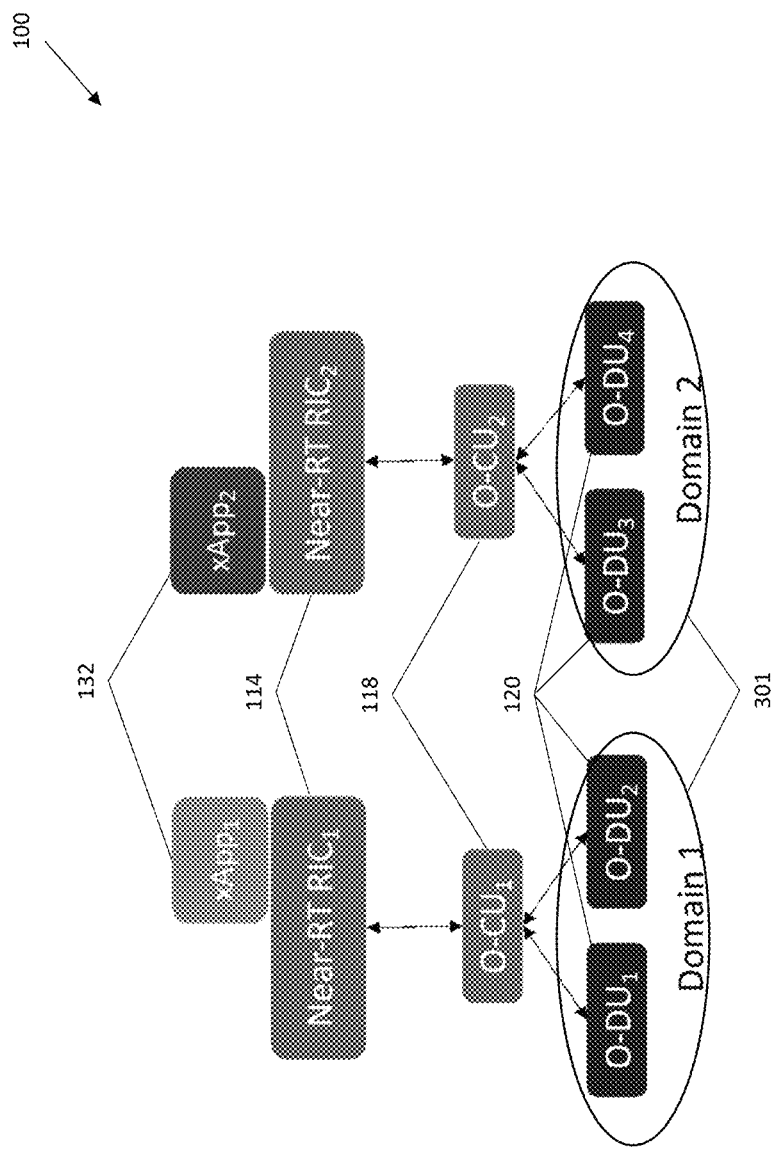
FIG. 6 depicts an inter-domain conflict according to one or more embodiments of the present invention.

FIG. 6 depicts an inter-domain conflict according to one or more embodiments of the present invention. From the domain point of view, an inter-domain conflict is one in which conflicting xApps 132 reside on two (or more) different near-RT RICs 114, i.e., actions performed in one domain 301 have consequences in another domain 301 that conflict with policies specified for that domain 301. Herein, such near-RT RICs 114, where a first xApp 132 from a first near-RT RIC 114 can affect policies of a second near-RT RIC 114 are referred to as "neighboring near-RT RICs."

At block 210, the non-RT RIC 112 receives, and stores optimization targets that xApps 132 can claim in corresponding xApp descriptors (see FIG. 3), e.g., retainability, accessibility, packet loss, etc. FIG. 7 depicts an example descriptor collection 302, with entries 702 corresponding to respective xApp 132. The non-RT RIC 112 maintains the collection 302 for the available xApps 132, where each xApp 132 is mapped to its optimization targets 704. Each xApp 132 is further mapped to the configuration parameters 706 that the particular xApp 132 aims to modify. Any change in the xApp functionality that led to the updated optimization targets 702 or targeted configuration parameters 704 are reflected in the xApp descriptor collection 302. For example, the optimization targets 704 and/or the configuration parameters 706 can be updated by an operator/developer by changing the settings of the xApp 132, or the functionality (source code/script) of the xApp 132.

At block 212, each xApp 132 logs each successful transaction (update) locally on the near-RT RIC 114. The near-RT RICs 114 regularly or on demand feed the activity log to the conflict detector 302 hosted in the non-RT RIC 112, at block 214. The conflict detector obtains the log in form of files from all connected near-RT RICs 112 in one or more embodiments of the present invention.

The conflict detector 302 correlates the received logged data, for example, on the basis of timestamps for each logged update performed by the xApps 132, at block 216. The example of the correlated log file is shown in Global xApp Activity Log 800 in FIG. 8. Each columns in the log 800 respectively corresponds to information logged by the xApp Activity Logger 404: data and time when the successful activity installation has been observed in the network, identity of the near-RT RIC instance, E2 nodes which are affected with the update, xApp ID, triggering conditions, optimization goal, the list of all the parameters affected with the activity, etc. It is understood that in one or more embodiments of the present invention fewer, different, or additional information can be captured in the log 800.

Further, at block 218 the non-RT RIC 112 updates the performance and fault data matrix 310. FIG. 9 depicts an example performance and fault data matrix 310. The matrix 310 is used to keep track about the performance and fault data from the controlled E2 nodes 202. This data includes both network and user key performance indicators (KPIs) and are all tagged with corresponding timestamps when the data is generated.

Further, at block 220, the operations module 306 receives the operational intents from an operator. The intent covers the aspect of the desired KPI thresholds, sustainable KPI degradation buffer, allowed KPI loss in case of major outages and other intents. The intents can be based for various reasons, such as energy optimization, latency improvements, quality of service improvements, bandwidth increases, efficient resource utilization, or other technical advantages. The intents can also be designed to achieve one or more business goals, SLA conditions, etc. For example, the intent can be specified as follows. If accessibility is less than 98% then maximum session establishment delay must be less than 3 ms; otherwise, maximum session establishment delay must be less than 5 ms; or in presence of link failures, maximum session establishment delay must be maximum 7 ms, etc.

At block 222, the analytics module 308 creates an impact matrix by correlating input data, including the xApp descriptor collection 302, global xApp activity log 800, performance and fault data matrix 310, and the operational intents.

Figure 10:
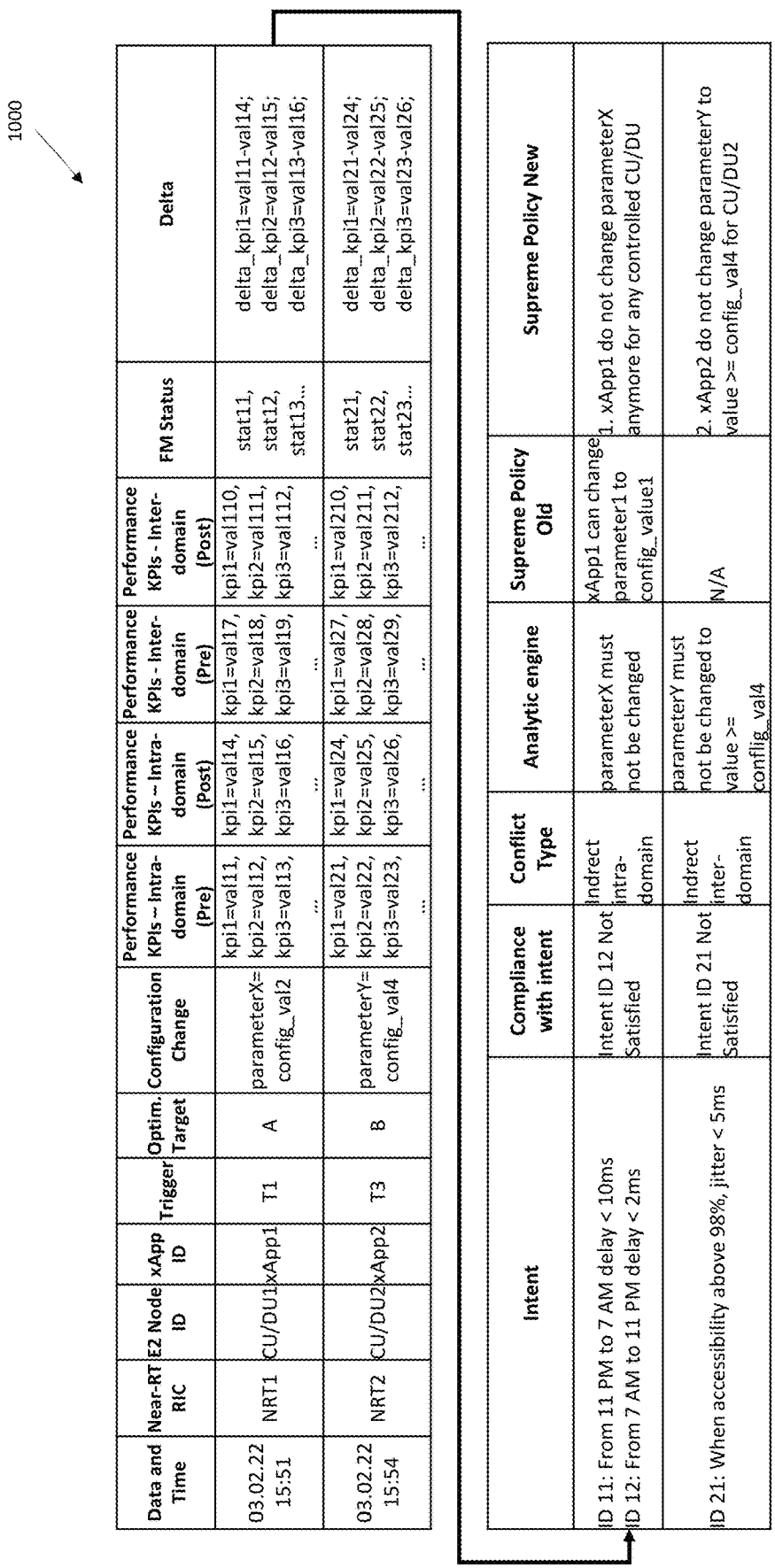
FIG. 10 depicts an example impact matrix that establishes an awareness in the non-RT RIC about the xApp activities in all of the associated near-RT RICs according to one or more embodiments of the present invention.

FIG. 10 depicts an example impact matrix 1000 that establishes an awareness in the non-RT RIC 112 about the xApp activities in all of the associated near-RT RICs 114. Correlation of the global xApp activity log 800 and performance and fault data matrix 310 facilitates obtaining the information about the network response that followed each action performed by the xApps 132. Therefore, non-RT RIC 112 has holistic overview of the xApp activities and their impact on the KPIs for both intra- and inter-domain case. This information is leveraged to create patterns that assist in conflict detection.

The operational intents received from the operator are essential for conflict mitigation as they reflect the operator's desires regarding network operation and therefore are used to identify the optimal xApp behavior for each network state. In general, the xApp actions at any time must be such that they maintain the satisfactory KPIs or improve the degraded KPIs, while keeping intent into consideration. The analytics module 308 is used for this purpose. The analytics module 308 is aware of the optimization goals of each xApp 132 and parameters that each xApp 132 can affect. Only then the analytics module 308 can tune the xApp activity according to the intent requirements.

Based on the impact matrix 1000 and the intent the analytics module 308 generates and outputs the policy(ies) that governs the xApp behavior, at block 224. In one or more embodiments of the present invention, the analytics module 308 uses reinforcement learning to determine the policies (224).

Reinforcement learning is a subfield of machine learning and is also a general-purpose formalism for automated decision-making and AI. The goal, in reinforcement learning is to take suitable action to maximize reward in a particular situation. Reinforcement learning (RL) is not strictly supervised as it does not rely only on a set of labelled training data but is not unsupervised learning because an agent is trained to maximize a reward. The agent needs to find the "right" actions to take in different situations to achieve its overall goal. There are three basic concepts in reinforcement learning: state, action, and reward. The algorithm (agent) evaluates a current situation (state), takes an action, and receives feedback (reward) from the environment after each act. Positive feedback is a reward, and negative feedback is punishment for making a mistake. Markov Property: requires that "the future is independent of the past given the present." RL relies on the state transition probability, which indicates, given a present state what is the probability the next state will occur. Further, in RL, all state transitions can be defined in terms of a State Transition Matrix P, where each row provides the transition probabilities from one state to all possible successor states. When an agent is transitioned from the current state to the next state it is either rewarded positively or negatively based on the actions of the agent following a particular policy.

For example, the analytics module 308 can generate a policy: xApp1 may update param1 to val1 or val2 on E2 node CU/DU1, xApp2 must be blocked from changing param2, but can change param3 on the CU/DU1 and CU/DU2.

Policies are sent over A1 interface to the conflict mitigator 402 in the respective near-RT RICs 114. Conflict mitigator 402 leverages the received policies when responding to E2 guidance request that causes an update to one or more xApps 132. For example, in the above policy example, if xApp2 attempts to update the param2 on the E2 node CU/DU1, the conflict mitigator 402 responds with rejection. On the other hand, the conflict mitigator 402 does not block xApp2 from making changes on the param3 on the same E2 node.

In one or more embodiments of the present invention, the conflict mitigator 402 is able to record the instructions received in the individual policies and retrieve these when xApps 132 call E2 guidance requests and verify the requested xApp activity.

In one or more embodiments of the present invention, the policies (224) sent over A1 interface can also be received by individual xApps 132 which may use these to tune their own behavior (if possible).

In the cases where policy(ies) is sent to the near-RT RICs 114, periodic feedback at predetermined frequency is taken from the E2 nodes 202, which is used to monitor the KPIs after the policy implementation. These feeds are added to the impact matrix in some embodiments of the present invention. Afterwards, the analytics module 308 analyzes if the intents have been fulfilled.

For example, the near-RT RIC 114 creates snapshots of the KPIs of an xApp 132 before and after that xApp 132 has made certain updates. Thus, the delta of the impact can be analyzed and assessed if it is meeting the operation targets. Here, a "snapshot of KPIs" can include a digital collection of the parameter values that are considered as KPIs of the xApp 132. The snapshot can be a data structure of file stored electronically.

Analytics Module 308 can also revert the policy if it identifies that it did not result with the desired network behavior. The policy revert activity is also logged for future reference.

In summary, the method 200 improves the O-RAN 100 and provides a practical application to detect and mitigate conflicts by performing several operations. It is understood that one or more of the described operations can be performed in parallel and/or in sequence. Embodiments herein facilitate comprehensive conflict mitigation in O-RAN 100 by using xApp activity logger 404 that delivers activity logs of xApps 132 on near-RT RICs 114 to the non-RT RIC 112. Analytics module 308 obtains, as input, onboarded xApp descriptor collection 302, correlated logs from multiple near-RT RICs 114, performance and fault data 310, and operational intents from the operations module 306. Further, analytics Module 308 correlates all the input information and identifies the policies that tune xApp behavior to mitigate direct, indirect, and implicit conflicts intra- and inter-domain. The generated policies are delivered to the conflict mitigator 404 in the near-RT RIC 114, which stores them and uses them when deciding on approving or rejecting specific updates requested by the xApps 132.

It should be noted that the non-RT RIC 112 and near-RT RIC 114 include several other components (such as interface termination modules, databases, shared data layers, messaging infrastructures, etc.) than what are depicted in drawings herein. Only the relevant components are depicted and described herein. Also, in O-RAN each network function 104 is deployed as a container. Here, "containers" are executable units of software in which application code is packaged, along with its libraries and dependencies, in common ways so that it can be run anywhere, whether it be on desktop, traditional IT, or the cloud. It should be noted that containers unlike virtual machines, do not need include a guest OS in every instance and can, instead, simply leverage the features and resources of the host OS. Further, non-RT RIC 112 captures the information about network-wide conditions in several manners. For example, information about the underlying cloud infrastructure is received over the interface O2. FCAPS-related information about the deployed network functions can be captured over the interface O1. Further, information about the user plane conditions is received from all the connected near-RT RICs 114 over the A1 interface. Each near-RT RIC 114 has the information about local domain conditions, e.g., about the user and control plane conditions received from the connected E2 nodes and information about the local hardware on which it is deployed, e.g., CPU usage, available cores, etc.

Embodiments of the present invention facilitate detection, resolution, and mitigation of direct, indirect, and implicit conflicts intra- and inter-domain in programmable networks with hierarchically organized operation plane. Embodiments of the present invention facilitate network analytics/policy application activity logging. Such logging facilitates collection of detailed activities triggered by xApps 132 in a stateful manner (each activity is logged together with preceding/triggering network conditions). Log correlation and pattern detection is incorporated for collecting the stateful xApp activity logs from different lower-level entities and aggregating these logs to detect the patterns that assist the operation of the analytics module. Here, lower-level entities include near-RT RICs.

Further, embodiments of the present invention facilitate network analytics/policy application to collect optimization targets of the deployed xApps 132 and their actionable parameters. Intent-based policy collection from the operator is also enabled. Such operator-provided intent-based input covers all the aspects regarding desired, sustainable, and actionable KPIs. In one or more embodiments of the present invention, human readable policy/input from the operator is converted into a machine consumable format.

Further yet, an Analytics Module is used for generating policy for each near-RT RIC and/or each xApp on each near-RT RIC. The policy is sent and applied to the respective near-RT RIC to facilitate detection, resolution, and mitigation of direct, indirect, and implicit conflicts intra- and inter-domain in programmable networks with hierarchically organized operation plane.

Embodiments of the present invention also facilitate centralizing post-action verification process and decision making for network governance by incorporating different dynamic aspects of the control and user plane.

Another technical challenge addressed by embodiments of the present invention is to perform impact analysis of different operation actions in one domain and its corresponding impact in neighboring domain, and avoid, or mitigate such effects. This is enabled by using non-RT RIC to perform the one or more operations described herein.

Embodiments of the present invention address the technical challenges with conflicts in an O-RAN by facilitating identification of intra- and inter-domain conflicts of various types (direct, indirect, implicit). Further, embodiments of the present invention streamline introduction of new rApps and xApps. Embodiments of the present invention facilitate collecting network operation related intents from operators and translating those intents into vendor specific terminology by considering the control application descriptors. This is needed for generating policies to handle direct, indirect & implicit conflicts which is not covered in provided patent. Further yet, embodiments of the present invention collect control actions towards all the near-RT RICs to prepare a global history at the non-RT RIC. Accordingly, each control node's (i.e., near-RT RIC) individual impact analysis is aggregated. Hence, impact of one domain action on other domain can be analyzed, which is required to perform inter domain conflict management. In turn, the non-RT RIC can create network wide policy based on operational intents and historical action impact analysis from across all of the near-RT RICs. The policy is autonomously generated using machine learning, such as reinforcement learning to tune xApp activities for mitigating direct, indirect, and implicit conflicts, which can be intra-domain and/or inter-domain.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

Figure 11:
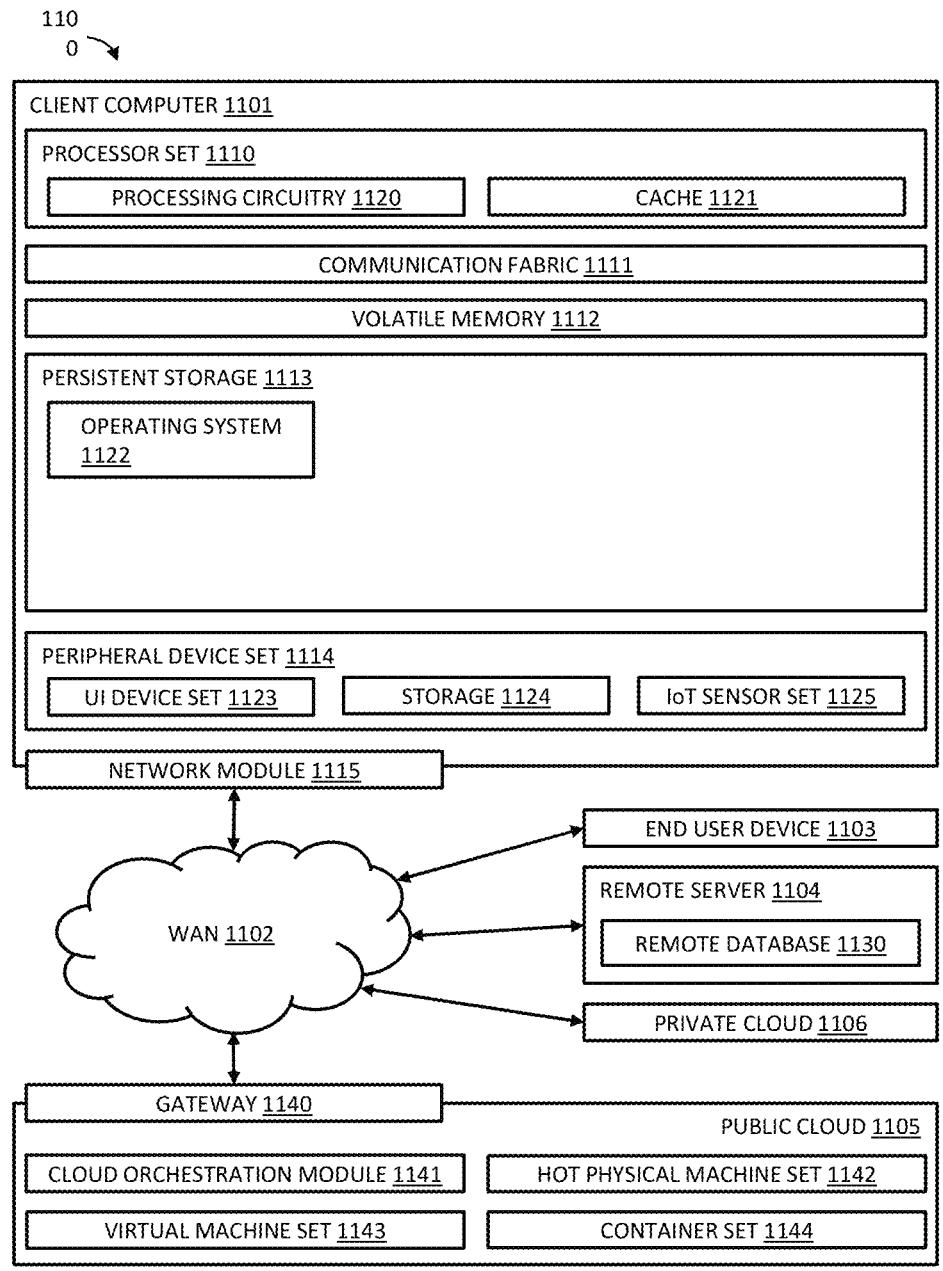
FIG. 11 depicts a computing environment in accordance with one or more embodiments of the present invention.

FIG. 11 depicts a computing environment in accordance with one or more embodiments of the present invention. Computing environment 1100 contains an example of an environment for the execution of at least some of the computer code involved in performing the inventive methods, such as optimal compression of machine learning model 800. In addition to block 800, computing environment 1100 includes, for example, computer 1101, wide area network (WAN) 1102, end user device (EUD) 1103, remote server 1104, public cloud 1105, and private cloud 1106. In this embodiment, computer 1101 includes processor set 1110 (including processing circuitry 1120 and cache 1121), communication fabric 1111, volatile memory 1112, persistent storage 1113 (including operating system 1122, as identified above), peripheral device set 1114 (including user interface (UI), device set 1123, storage 1124, and Internet of Things (IoT) sensor set 1125), and network module 1115. Remote server 1104 includes remote database 1130. Public cloud 1105 includes gateway 1140, cloud orchestration module 1141, host physical machine set 1142, virtual machine set 1143, and container set 1144.

COMPUTER 1101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network, or querying a database, such as remote database 1130. As is well understood in the art of computer technology, and depending upon the technology, performance of a computer-implemented method may be distributed among multiple computers and/or between multiple locations. On the other hand, in this presentation of computing environment 1100, detailed discussion is focused on a single computer, specifically computer 1101, to keep the presentation as simple as possible. Computer 1101 may be located in a cloud, even though it is not shown in a cloud. On the other hand, computer 1101 is not required to be in a cloud except to any extent as may be affirmatively indicated.

PROCESSOR SET 1110 includes one, or more, computer processors of any type now known or to be developed in the future. Processing circuitry 1120 may be distributed over multiple packages, for example, multiple, coordinated integrated circuit chips. Processing circuitry 1120 may implement multiple processor threads and/or multiple processor cores. Cache 1121 is memory that is located in the processor chip package(s) and is typically used for data or code that should be available for rapid access by the threads or cores running on processor set 1110. Cache memories are typically organized into multiple levels depending upon relative proximity to the processing circuitry. Alternatively, some, or all, of the cache for the processor set may be located "off chip." In some computing environments, processor set 1110 may be designed for working with qubits and performing quantum computing.

Computer readable program instructions are typically loaded onto computer 1101 to cause a series of operational steps to be performed by processor set 1110 of computer 1101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1121 and the other storage media discussed below. The program instructions, and associated data, are accessed by processor set 1110 to control and direct performance of the inventive methods. In computing environment 1100, at least some of the instructions for performing the inventive methods may be stored in block 800 in persistent storage 1113.

COMMUNICATION FABRIC 1111 is the signal conduction paths that allow the various components of computer 1101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1112 is any type of volatile memory now known or to be developed in the future. Examples include dynamic type random access memory (RAM) or static type RAM. Typically, the volatile memory is characterized by random access, but this is not required unless affirmatively indicated. In computer 1101, the volatile memory 1112 is located in a single package and is internal to computer 1101, but, alternatively or additionally, the volatile memory may be distributed over multiple packages and/or located externally with respect to computer 1101.

PERSISTENT STORAGE 1113 is any form of non-volatile storage for computers that is now known or to be developed in the future. The non-volatility of this storage means that the stored data is maintained regardless of whether power is being supplied to computer 1101 and/or directly to persistent storage 1113. Persistent storage 1113 may be a read only memory (ROM), but typically at least a portion of the persistent storage allows writing of data, deletion of data and re-writing of data. Some familiar forms of persistent storage include magnetic disks and solid state storage devices. Operating system 1122 may take several forms, such as various known proprietary operating systems or open source Portable Operating System Interface type operating systems that employ a kernel. The code included in block 800 typically includes at least some of the computer code involved in performing the inventive methods.

PERIPHERAL DEVICE SET 1114 includes the set of peripheral devices of computer 1101. Data communication connections between the peripheral devices and the other components of computer 1101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 1123 may include components such as a display screen, speaker, microphone, wearable devices (such as goggles and smart watches), keyboard, mouse, printer, touchpad, game controllers, and haptic devices. Storage 1124 is external storage, such as an external hard drive, or insertable storage, such as an SD card. Storage 1124 may be persistent and/or volatile. In some embodiments, storage 1124 may take the form of a quantum computing storage device for storing data in the form of qubits. In embodiments where computer 1101 is required to have a large amount of storage (for example, where computer 1101 locally stores and manages a large database) then this storage may be provided by peripheral storage devices designed for storing very large amounts of data, such as a storage area network (SAN) that is shared by multiple, geographically distributed computers. IoT sensor set 1125 is made up of sensors that can be used in Internet of Things applications. For example, one sensor may be a thermometer and another sensor may be a motion detector.

NETWORK MODULE 1115 is the collection of computer software, hardware, and firmware that allows computer 1101 to communicate with other computers through WAN 1102. Network module 1115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1115 are performed on the same physical hardware device. In other embodiments (for example, embodiments that utilize software-defined networking (SDN)), the control functions and the forwarding functions of network module 1115 are performed on physically separate devices, such that the control functions manage several different network hardware devices. Computer readable program instructions for performing the inventive methods can typically be downloaded to computer 1101 from an external computer or external storage device through a network adapter card or network interface included in network module 1115.

WAN 1102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1103 is any computer system that is used and controlled by an end user (for example, a customer of an enterprise that operates computer 1101), and may take any of the forms discussed above in connection with computer 1101. EUD 1103 typically receives helpful and useful data from the operations of computer 1101. For example, in a hypothetical case where computer 1101 is designed to provide a recommendation to an end user, this recommendation would typically be communicated from network module 1115 of computer 1101 through WAN 1102 to EUD 1103. In this way, EUD 1103 can display, or otherwise present, the recommendation to an end user. In some embodiments, EUD 1103 may be a client device, such as thin client, heavy client, mainframe computer, desktop computer and so on.

REMOTE SERVER 1104 is any computer system that serves at least some data and/or functionality to computer 1101. Remote server 1104 may be controlled and used by the same entity that operates computer 1101. Remote server 1104 represents the machine(s) that collect and store helpful and useful data for use by other computers, such as computer 1101. For example, in a hypothetical case where computer 1101 is designed and programmed to provide a recommendation based on historical data, then this historical data may be provided to computer 1101 from remote database 1130 of remote server 1104.

PUBLIC CLOUD 1105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1105 is performed by the computer hardware and/or software of cloud orchestration module 1141. The computing resources provided by public cloud 1105 are typically implemented by virtual computing environments that run on various computers making up the computers of host physical machine set 1142, which is the universe of physical computers in and/or available to public cloud 1105. The virtual computing environments (VCEs) typically take the form of virtual machines from virtual machine set 1143 and/or containers from container set 1144. It is understood that these VCEs may be stored as images and may be transferred among and between the various physical machine hosts, either as images or after instantiation of the VCE. Cloud orchestration module 1141 manages the transfer and storage of images, deploys new instantiations of VCEs and manages active instantiations of VCE deployments. Gateway 1140 is the collection of computer software, hardware, and firmware that allows public cloud 1105 to communicate through WAN 1102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1106 is similar to public cloud 1105, except that the computing resources are only available for use by a single enterprise. While private cloud 1106 is depicted as being in communication with WAN 1102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1105 and private cloud 1106 are both part of a larger hybrid cloud.

The present invention can be a system, a method, and/or a computer program product at any possible technical detail level of integration. The computer program product can include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions can also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for addressing conflicts in a radio access network (RAN), the computer-implemented method comprising:
   generating, by a non-Real-Time RAN Intelligent Controller (non-RT RIC), a policy for a near-Real-Time RAN Intelligent Controller (near-RT RIC) by analyzing an activity log of a plurality of xApps, which are being executed by the near-RT RIC; and
   sending, by the non-RT RIC the policy to the near-RT RIC to cause the near-RT RIC, in response to receiving a request from an xApp from the plurality of xApps to update a parameter of the RAN:
      update the parameter based on the policy allowing the xApp to update the parameter; and
      maintain the parameter unchanged based on the policy restricting the xApp to update the parameter.

2. The computer-implemented method of claim 1, wherein the activity log further comprises log data of xApps being executed across a plurality of near-RT RICs.

3. The computer-implemented method of claim 1, wherein the non-RT RIC generates the policy using machine learning.

4. The computer-implemented method of claim 1, wherein the near-RT RIC updates the activity log in response to each action taken by any of the plurality of xApps.

5. The computer-implemented method of claim 1, wherein the policy is generated to avoid a conflict detected by the analyzing of the activity log.

6. The computer-implemented method of claim 5, wherein the conflict is one of a direct conflict, an indirect conflict, and an implicit conflict.

7. The computer-implemented method of claim 5, wherein the conflict is one of an intra-domain conflict and an inter-domain conflict.

8. The computer-implemented method of claim 1, wherein the near-RT RIC:
   captures a snapshot of one or more performance indicators prior to changing the parameter;
   captures a snapshot of the one or more performance indicators after changing the parameter; and
   validates the policy by checking that the one or more performance indicators satisfy a desired intent.

9. The computer-implemented method of claim 1, further comprising:
   receiving, by the non-RT RIC, one or more operational intents that specify desired operating ranges for one or more performance indicators; and
   wherein, the policy is generated based on the activity log and the one or more operational intents.

10. The computer-implemented method of claim 1, wherein the policy restrains the xApp to update the parameter within a particular range.

11. The computer-implemented method of claim 1, wherein the xApp is a first xApp, and wherein the policy restrains the first xApp to update the parameter, and does not restrain a second xApp to update the parameter.

12. The computer-implemented method of claim 1, wherein the near-RT RIC is a first near-RT RIC, and wherein the non-RT RIC sends the policy to a second near-RT RIC to be applied to the plurality of xApps being executed by the second near-RT RIC.

13. A system comprising:
a non-real-time radio access network intelligent controller (non-RT RIC) of a radio access network (RAN); and
a plurality of near-real-time RAN intelligent controllers (near-RT RICs) of the RAN, the non-RT RIC controls one or more operations of the near-RT RICs;
wherein:
the non-RT RIC generates a policy for a near-RT RIC from the plurality of near-RT RICs by analyzing an activity log of a plurality of xApps being executed by the near-RT RIC;
in response to receiving a request from an xApp from the plurality of xApps to update a parameter of the RAN:
the near-RT RIC updates the parameter based on the policy allowing the xApp to update the parameter; and
the near-RT RIC maintains the parameter unchanged based on the policy restricting the xApp from updating the parameter.

14. The system of claim 13, wherein the xApp is a first xApp, and wherein the policy restrains the first xApp to update the parameter, and does not restrain a second xApp to update the parameter.

15. The system of claim 13, wherein the near-RT RIC is a first near-RT RIC, and wherein the non-RT RIC sends the policy to a second near-RT RIC to be applied to the plurality of xApps being executed by the second near-RT RIC.

16. The system of claim 13, wherein,
the non-RT RIC receives one or more operational intents that specify desired operating ranges for one or more performance indicators; and
the non-RT RIC generates the policy based on the activity log and the one or more operational intents.

17. The system of claim 16, wherein, the non-RT RIC generates the policy further based on performance and fault data captured by the non-RT RIC.

18. The system of claim 17, wherein the non-RT RIC generates the policy using reinforcement learning.

19. A computer program product comprising a memory device with computer-executable instructions therein, the computer-executable instructions when executed by a processing unit perform a method comprising:
generating, by a non-Real-Time RAN Intelligent Controller (non-RT RIC) of a radio access network (RAN), a policy for a near-Real-Time RAN Intelligent Controller (near-RT RIC) by analyzing an activity log of a plurality of xApps, which are being executed by the near-RT RIC; and
sending, by the non-RT RIC the policy to the near-RT RIC to cause the near-RT RIC, in response to receiving a request from an xApp from the plurality of xApps to update a parameter of the RAN:
update the parameter based on the policy allowing the xApp to update the parameter; and
maintain the parameter unchanged based on the policy restricting the xApp to update the parameter.

20. The computer program product of claim 19, wherein the non-RT RIC generates the policy further based on performance and fault data and one or more operational intents, the policy generated using machine learning.

* * * * *